(12) United States Patent
Oh

(10) Patent No.: US 6,405,566 B1
(45) Date of Patent: Jun. 18, 2002

(54) METHOD AND DEVICE FOR OVER-CLADDING AN OPTICAL FIBER PRIMARY PREFORM

(75) Inventor: Seung-Hun Oh, Gumi (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/292,977

(22) Filed: Aug. 22, 1994

(30) Foreign Application Priority Data

Nov. 29, 1993 (KR) .............................. 93-25712

(51) Int. Cl.⁷ .......................................... C03B 37/012
(52) U.S. Cl. ............................ 65/412; 65/428; 65/501; 65/529
(58) Field of Search ...................... 65/412, 419, 428, 65/501, 529

(56) References Cited

U.S. PATENT DOCUMENTS

| | | | |
|---|---|---|---|
| 2,980,957 A | * | 4/1961 | Hicks ........................... 65/412 |
| 4,117,802 A | | 10/1978 | Le Sergent |
| 4,233,045 A | | 11/1980 | Sarkar |
| 4,251,251 A | | 2/1981 | Blankenship |
| 4,283,213 A | | 8/1981 | Akers |
| 4,306,767 A | | 12/1981 | Kawachi |
| 4,328,018 A | | 5/1982 | Siegfried |
| 4,362,545 A | | 12/1982 | Bailey |
| 4,519,826 A | | 5/1985 | Tran |
| 4,596,589 A | | 6/1986 | Perry |
| 4,643,751 A | | 2/1987 | Abe |
| 4,734,117 A | | 3/1988 | Pilon |
| 4,793,842 A | * | 12/1988 | Yokota ........................ 65/412 |
| 4,820,322 A | | 4/1989 | Baumgart et al. |
| 5,000,773 A | | 3/1991 | Le Noane |
| 5,047,076 A | | 9/1991 | Cognolato |
| 5,131,936 A | | 7/1992 | Cogtnolato |
| 5,152,818 A | * | 10/1992 | Berkey ........................ 65/412 |
| 5,160,522 A | * | 11/1992 | Takagi ........................ 65/412 |
| 5,173,097 A | | 12/1992 | Jansen |
| 5,182,783 A | | 1/1993 | Bosc |
| 5,236,481 A | | 8/1993 | Berkey |

FOREIGN PATENT DOCUMENTS

| | | | |
|---|---|---|---|
| EP | 0109192 | | 5/1984 |
| EP | 501429 | * | 9/1992 ................. 65/412 |
| JP | 5413351 | * | 1/1979 ................. 65/412 |

* cited by examiner

*Primary Examiner*—John Hoffman
(74) *Attorney, Agent, or Firm*—Robert E. Bushnell, Esq.

(57) ABSTRACT

A method and device for providing an optical fiber secondary preform by collapsing an over-cladding tube on an optical fiber primary preform is disclosed in the present invention. The device for over cladding the optical fiber primary preform includes a hand bar as a first supporter for supporting the optical fiber primary preform, which hand bar has a sealing-up part of the over-cladding tube on an outer diameter part thereof and also includes a supporting handle tube as a second supporter for supporting the over-cladding tube, which the purity of the supporting handle tube is different from that of the over-cladding tube. Also the supporting handle tube includes a ring to make it equal two centers of the optical fiber primary preform and the over-cladding tube.

8 Claims, 3 Drawing Sheets

METHOD AND DEVICE FOR OVER-CLADDING AN OPTICAL FIBER PRIMARY PREFORM

BACKGROUND OF THE INVENTION

1. Field of the Invention

The present invention relates to a method and device for manufacturing an optical fiber secondary preform made by progressively collapsing an over-cladding tube on an optical fiber primary preform.

2. Description of the Prior Art

An optical fiber primary preform is manufactured by a well known process such as a modified chemical vapor deposition. One modified chemical vapor deposition process is disclosed by John B. MacChesney, et al.,in U.S. Pat. No. 4,217,027 entitled Optical Fiber Fabrication And Resulting Product. The optical fiber primary preform should have the volume ratio of a core to a clad within a given limitation. To raise the efficiency of production, the over-cladding tube collapses on the optical fiber primary preform, which over-cladding tube is made of glass with a prescribed optical and geometrical specialty. Further, the optical fiber primary preform is placed within the over-cladding tube. Then, the optical fiber secondary preform is produced by collapsing the over-cladding tube on the optical fiber primary preform.

A conventional method for producing such optical fiber secondary preform is disclosed in U.S. Pat. No. 4,668,263 to Hirosi Yokota, et al. entitled Method For Producing Glass Preform For Optical Fiber. The optical fiber secondary preform is produced by collapsing the over-cladding tube on the optical fiber primary preform. The conventional method for producing such optical fiber secondary preform is shown in FIG. 1. In the construction of FIG. 1, the over-cladding tube 32 engages with chucks 30 of a glass lathe, a turning connecter 40 is joined with one side of the over-cladding tube 32, and a gas suck hole 38 is set up in the turning connecter 40. A vacuum pump 46 is set up in the gas suck hole 38 by a valve connection 42. The optical fiber primary preform 34 is set up within the over-cladding tube 32 by a supporter 36. Under this structure, as shown in FIG. 2, one end side of the over-cladding tube 32 is sealed up by using a burner 44, then the temperature influenced by the burner 44 is maintained as over nineteen hundred degrees centigrade. The burner 44 is moved along a circumference of the over-cladding tube 32 in order to collapse the over-cladding tube 32 on the optical fiber primary preform 34. Then the optical fiber secondary preform is produced.

In such conventional method for producing the optical fiber secondary preform, problems still remain. Since the optical fiber primary preform receives more heat than the over-cladding tube receives, as the heating time is long in a procedure to seal up one end of the over-cladding tube, there is a problem that a concentricity error becomes large by the melt. There is further problem that the thicker the thickness of the over-cladding tube is the more difficult it is to seal. Further, there is much material loss, since the part engaged with the chucks of the glass lathe or the non-collapsed part should be cut off as useless parts after producing the optical fiber secondary preform, which is produced by the collapse of the over-cladding tube on the optical fiber primary preform.

The Method For Producing A Single Mode Fiber Preform disclosed in U.S. Pat. No. 4,596,589 to Gregory A. Perry uses supporting elements different from Yokota, et al. Perry employs a handle to which the core or primary preform is symmetrically adhered at one end thereof, and the handle is chucked into the tailstock of a lathe. A barrier or over-cladding tube is slid over the primary preform until one end of the over-cladding tube aligns with the adhered end of the primary preform. A tack weld to weld the over-cladding tube to the primary preform is made near to the headend of the lathe, and the ends of the primary preform and over-cladding tube adjacent the headend of the lathe are chucked to the headend so that the work piece can be rotated while heating the over-cladding tube in order to collapse the over-cladding tube onto the primary preform.

There is a problem in Perry's method wherein the heating is a chance of the longitudinal center of the over-cladding tube is off-center from the longitudinal center of the primary preform resulting in a large concentricity error by the melt.

SUMMARY OF THE INVENTION

It is therefore, an object of the present invention to provide a method and device for over cladding an optical fiber primary preform which reduces concentricity error of the core when collapsing an over-cladding tube on an optical fiber primary preform.

It is another object of the present invention to provide a method and device for over cladding the optical fiber primary preform which can reduce raw material loss.

It is still another object of the present invention to provide a method and device for over cladding the optical fiber primary preform which is easily sealed up one end side of the over-cladding tube.

In accordance with the present invention for achieving these objects, one end side of the optical fiber primary preform adheres to a hand bar in a longitudinal direction for supporting the optical fiber primary preform. The hand bar has a sealing-up part on a circumference part of the hand bar for sealing up one end side of the over-cladding tube. The purity of the hand bar is different from that of the over-cladding tube. A supporting handle tube for supporting another end side of the over-cladding tube adheres to the another end side of the over-cladding tube in the longitudinal direction. A quartz ring is inserted into an inner diameter of the supporting handle tube which has low purity in order to fix the longitudinal center, or axis, of the optical fiber primary preform concentrically with the longitudinal center of the over-cladding tube. The optical fiber primary preform is inserted into the inner diameter of the ring and a part of an optical fiber primary preform supporter, ie. part of the hand bar, is sealed up in the inner diameter of the over-cladding tube. With a predetermined collapse condition, the over-cladding tube collapses on the optical fiber primary preform by heat during rotation.

BRIEF DESCRIPTION OF THE DRAWINGS

The above objects and other advantages of the present invention will become more apparent by describing the preferred embodiment of the present invention with reference to the attached drawings, in which.

DETAILED DESCRIPTION OF THE PREFERRED EMBODIMENT

In the following description, numerous specific details are set forth to provide a more thorough understanding of the present invention. It will be apparent, however, to one skilled in the art, that the present invention may be practiced without these specific details. In other instances, well known drawings have not been described so as not to obscure the present invention.

Figure 1:
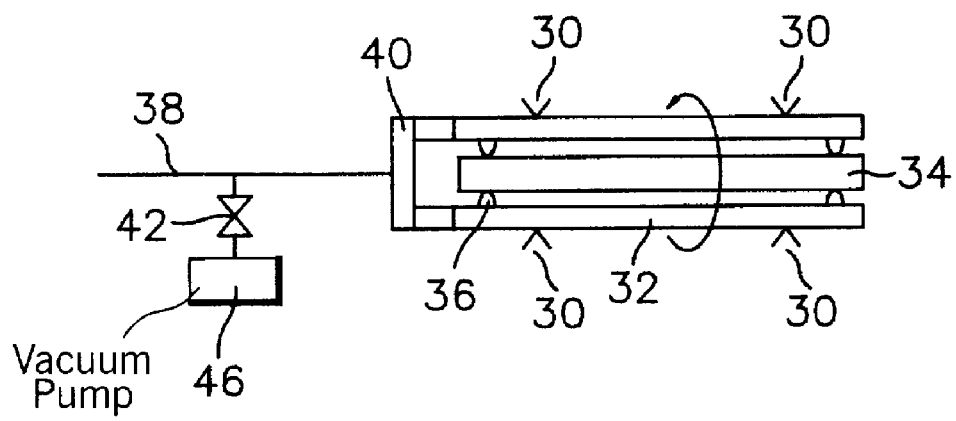
FIG. 1 is a sectional view showing an optical fiber primary preform is set up to have the same center as that of a conventional over-cladding tube.
Figure 2:
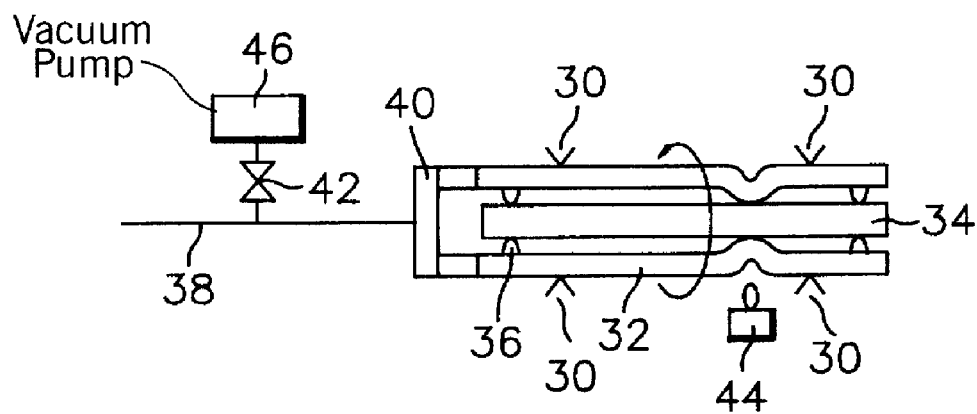
FIG. 2 is a sectional view showing an over-cladding tube collapses on the optical fiber primary preform by a burner moved along the over-cladding tube shown in FIG. 1.
Figure 3:
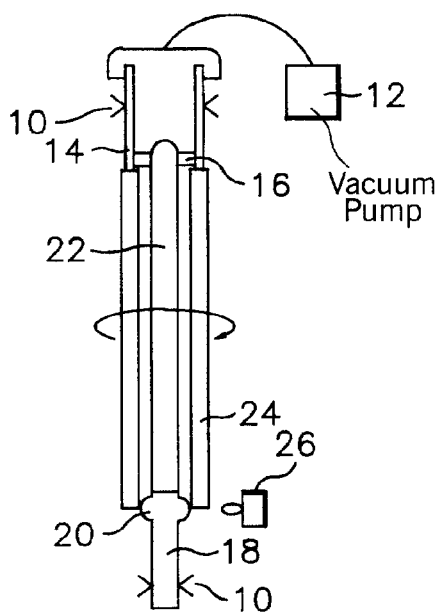
FIG. 3 is a sectional view showing an optical fiber primary preform is set up to have the same center as that of an over-cladding tube according to the present invention.

The following is a preferred embodiment according to the present invention, as shown from FIG. 3 to FIG. 9. In FIG. 3, an over-cladding tube 24 with a given optical and geometrical specialty in an actual linear form and an optical fiber primary preform 22 are provided. The optical fiber primary preform 22 should have the volume ratio of a core to a clad within a given limitation.

Figure 7:
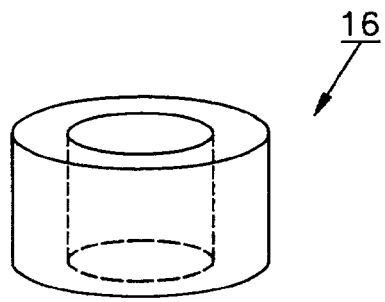
FIG. 7 is an enlarged side elevation of a quartz ring shown in FIG. 3.

A supporting handle tube 14 (third means) for supporting the over-cladding tube 24 adheres to one end side of the high purity over-cladding tube 24 with the same longitudinal center. The purity of the supporting handle tube 14 is lower than that of the over-cladding tube 24. A quartz ring 16 is inserted into an inner diameter of the supporting handle tube 14 so as to lessen an off-center distance of the longitudinal center of the over-cladding tube 24 from a longitudinal center of the optical fiber primary preform 22. The ring 16 shown in FIG. 7 is over 10 millimeters long so that the longitudinal center of the optical fiber primary preform 22 and the longitudinal center of the over-cladding tube 24 may coincide with each other. The longitudinal center of ring 16 is concentric with the longitudinal center of over-cladding tube 24. Additionally, the optical fiber primary preform 22 is supported by hand bar 18 (first means), and hand bar 18 is also used to seal the inner diameter of the over-cladding tube 24. The hand bar 18 is rotated to allow burner 26 to apply heat uniformally to the circumference of the over-cladding tube 24, and vacuum pump 12 operates to reduce internal pressure during the heating process.

Figure 6:
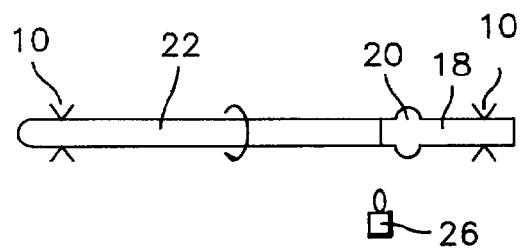
FIG. 6 is a drawing showing a hand bar adhered to an optical fiber primary preform by a burner, as shown in FIG. 3.

Referring to FIG. 6, a hand bar 18 for supporting the optical fiber primary preform 22 adheres, in response to heat from burner 26, to one end side of the optical fiber primary preform is 22 so that the hand bar 18 and the optical fiber primary preform are connected along the same longitudinal center.

Figure 4:
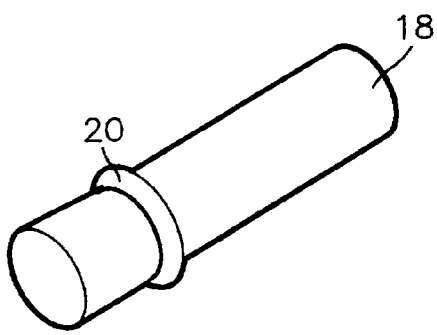
FIG. 4 is a side elevation of a hand bar shown in FIG. 3.
Figure 5:
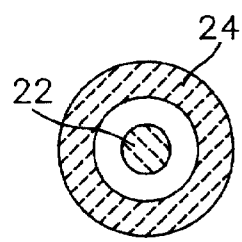
FIG. 5 is a cross sectional view of an optical fiber primary preform and an over-cladding tube, as shown in FIG. 3.
Figure 9:
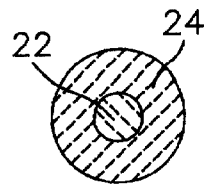
FIG. 9 is a cross sectional view of an optical fiber secondary preform provided by a method and device of the present invention.

Referring to FIG. 4, an annular over-cladding tube sealing-up part 20 (second means) for sealing up the over-cladding tube 24 is heated and is roundly and projectively formed on a portion of an outer diameter of the hand bar 18 along a circumference side of the over-cladding tube sealing-up part 20. The over-cladding tube sealing-up part 20 is used to seal the inner diameter of the over-cladding tube 24.

In order that the supporting handle tube 14, FIG. 3, adheres well to the over-cladding tube 24, the supporting handle tube 14 has a larger inner diameter than that of the over-cladding tube 24 and also has a smaller outer diameter than that of the over-cladding tube 24. The supporting handle tube 14 is over 300 millimeters long in order to have a working space when the supporting handle tube 14 engages with one side chuck 10 of a glass lathe.

Examples of diameter sizes for various components discussed above are given below. The supporting handle tube 14 has an inner diameter of 26 millimeters and an outer diameter of 32 millimeters. The ring 16 has an outer diameter smaller than the inner diameter of the supporting handle tube 14, the outer diameter being 25 millimeters and the inner diameter thereof being 19 millimeters. The over-cladding tube 24 has an outer diameter of 41 millimeters and an inner diameter of 21 millimeters. The optical fiber primary preform has an outer diameter of about 19 millimeters, so that the outer diameter of the optical fiber primary preform will abut the inner diameter of ring 16.

As mentioned earlier, the method and device according to the present invention are shown in FIG. 3. That is, a part of the optical fiber primary preform 22 is fit through the inner diameter of ring 16 so that the longitudinal center of the over-cladding tube 24 may coincide with the longitudinal center of the optical fiber primary preform 22. Also the annular over-cladding tube sealing-up part 20 formed on the hand bar 18 is set up to contact with the inner diameter of the over-cladding tube 24 to seal the inner diameter of the over-cladding tube 24. The supporting handle tube 14 engages with one side chuck 10 of the glass lathe and the hand bar 18 engages with another side chuck 10 of the glass lathe. Then the hand bar rotates. A vacuum pump 12 is connected to another end side of the supporting handle tube 14 and seals up the inner diameter of the supporting handle tube 14. The vacuum pump is operated to remove gases or air, due to the difference between the inner diameter of the supporting handle tube 14 and the outer diameter of ring 16, from the area between the optical fiber primary preform 22 and the over-cladding tube 24 during heating and operates thereby to reduce the pressure therein. The reduction of internal pressure will enable the over-cladding tube 24 to collapse onto the optical fiber primary preform 22. A burner 26 for heating the over-cladding tube 24 is set up, keeping a uniform distance from the circumference side of the over-cladding tube 24.

Figure 8:
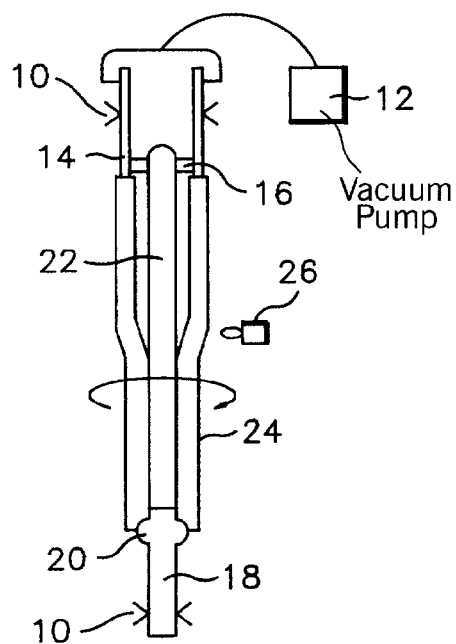
FIG. 8 is a sectional view showing an over-cladding tube collapsing on an optical fiber primary preform by a burner moved along the over-cladding tube shown in FIG. 3.

In the method and device according to the present invention, as shown in FIG. 8, the over-cladding tube sealing-up part 20 and the over-cladding tube 24 is sealed up by the burner 26. The pressure within the over-cladding tube 24 is controlled by the vacuum pump 12 in order to make a predetermined condition in turning the over-cladding tube 24. Further, the circumference side of the over-cladding tube 24 is heated by the burner 26, and then the over-cladding tube 24 collapses on the optical fiber primary preform 22. Thus producing the optical fiber secondary preform. Once the over-cladding tube 24 does not collapse on the optical fiber primary preform any more, the optical fiber secondary preform, produced by the method discussed above, becomes a final optical fiber preform from which an optical fiber can be drawn.

In accordance with the present invention as above-mentioned, there are effects that a longitudinal concentricity error is reduced, the productivity caused by reducing a sealing-up time of the over-cladding tube is increased and materials loss of the optical fiber primary preform and the over-cladding tube being high purity is reduced.

The foregoing description of the preferred embodiment of the invention is provided as an example, and the scope of the invention is not limited to the exact details of the construction described and shown. For example, the outer diameter of ring 16 may abut the inner diameter of supporting handle tube 14, wherein ring 16 would be provided with vent holes, or the inner diameter of ring 16 will be slightly larger than the outer diameter of the optical fiber primary preform 22, to facilitate the removal of gas from between the over-cladding tube 24 and optical fiber primary preform 22 during heating of the over-cladding tube 24 in order to collapse the over-cladding tube 24 onto the optical fiber primary preform 22. It is appreciated that this and other modifications to the inventive concepts may be apparent to those of ordinary skill in the art without departing from the spirit and scope of the invention.

What is claimed is:

1. A method of producing an optical fiber secondary preform by collapsing an over-cladding tube on an optical fiber primary preform, comprising the steps of:

adhering a first means to a first end of said optical fiber primary preform, wherein said first means supports said optical fiber primary preform on a first chuck, said first means having a second means for sealing a first end of said over-cladding tube, wherein said second means is formed on an outer diameter part of said first means;

adhering a third means to a second end of said over-cladding tube to support said second end of said over-cladding tube on a second chuck;

inserting a ring into an inner diameter of said third means, said ring being concentric with said second end of said over-cladding tube;

inserting a second end of said optical fiber primary preform through an inner diameter of said ring;

sealing the inner diameter of said third means with a vacuum pump;

turning on said vacuum pump;

rotating said over-cladding tube; and applying heat to said over-cladding tube while said over-cladding tube is rotated and collapsing said over-cladding tube on said optical fiber primary preform to produce said optical fiber secondary preform, said vacuum pump removing gas from between the over-cladding tube and the optical primary preform.

2. The method as claimed in claim 1, further comprising a step of sealing said first end of said over-cladding tube by heating said first end of said over-cladding tube and the second means of said first means.

3. The method as claimed in claim 1, said step of adhering said first means to said first end of said optical fiber preform comprises a step of heating said first means and said first end of said optical fiber primary preform.

4. A method of producing an optical fiber secondary preform by collapsing an over-cladding tube on an optical fiber primary preform, said optical fiber primary preform having a first means being adhered to one end of said optical fiber primary preform which supports said optical fiber primary preform during rotation, said first means having a second means for sealing a first end of said over-cladding tube, said over-cladding tube having a third means adhered to a second end of said over-cladding tube to support said second end of said over-cladding tube, said method comprising the steps of:

inserting a ring into an inner diameter of said third means, said ring being concentric with said second end of said over-cladding tube;

inserting a second end of said optical fiber primary preform through the inner diameter of said ring;

sealing the inner diameter of said third means with a vacuum pump means;

turning on said vacuum pump means to remove gas from between the over-cladding tube and the optical primary preform;

rotating said over-cladding tube; and collapsing said over-cladding tube on said optical fiber primary preform by applying heat to said over-cladding tube when said over-cladding tube is rotated under a predetermined collapse condition to produce said optical fiber secondary preform.

5. The method as claimed in claim 4, further comprising the steps of:

sealing the inner diameter of said third means with a vacuum pump means; and turning on said vacuum pump means to remove gas from between the over-cladding tube and the optical primary preform.

6. A method of producing an optical fiber secondary preform by collapsing an over-cladding tube on an optical fiber primary preform said optical fiber primary preform having a first means being adhered to one end of said optical fiber primary preform which supports said optical fiber primary preform during rotation, said first means having a second means for sealing a first end of said over-cladding tube, said over-cladding tube having a third means adhered to a second end of said over-cladding tube to support said second end of said over-cladding tube said method comprising the steps of:

inserting a ring into an inner diameter of said third means, said ring being concentric with said second end of said over-cladding tube;

inserting a second end of said optical fiber primary preform through the inner diameter of said ring;

sealing said first end of said over-cladding tube by heating said first end of said over-cladding tube and the second means of said first means;

rotating said over-cladding tube; and collapsing said over-cladding tube on said optical fiber primary preform by applying heat to said over-cladding tube when said over-cladding tube is rotated under a predetermined collapse condition to produce said optical fiber secondary preform.

7. A method of producing an optical fiber secondary preform by collapsing an over-cladding tube on an optical fiber primary preform, comprising the steps of:

adhering a first means to a first end of said optical fiber primary preform;

inserting said optical fiber preform into said over-cladding tube;

engaging said first means on a first chuck wherein said first means supports said optical fiber primary preform on said first chuck;

sealing a first end of said over-cladding tube with a second means by heating said first end of said over-cladding tube and said second means, said second means is disposed on an outer diameter part of one end of said first means;

adhering a third means to a second end of said over-cladding tube;

engaging said third means on a second chuck, wherein said third means supports said second end of said over-cladding tube on said second chuck;

inserting a ring into an inner diameter of said third means, said ring being concentric with said second end of said over-cladding tube;

sliding said ring over a second end of said optical fiber primary preform;

sealing said third means with a vacuum pump;

rotating said over-cladding tube by rotating said first means and said third means in said first and second chucks, respectively;

applying heat to said over-cladding tube while said over-cladding tube is rotated and collapsing said over-cladding tube on said optical fiber primary preform to produce said optical fiber secondary preform;

removing gas from between the over-cladding tube and the optical primary preform during said step of applying heat to said over-cladding tube by turning on said vacuum pump.

8. The method as claimed in claim 7, said step of adhering said first means to said first end of said optical fiber preform comprises a step of heating said first means and said first end of said optical fiber primary preform.

* * * * *